United States Patent [19]
Young

[11] Patent Number: 5,991,498
[45] Date of Patent: *Nov. 23, 1999

[54] VCR PROGRAMMING SYSTEM

[75] Inventor: Patrick Young, San Mateo, Calif.

[73] Assignee: StarSight Telecast, Inc., Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/719,109

[22] Filed: Sep. 24, 1996

Related U.S. Application Data

[63] Continuation of application No. 08/392,273, Feb. 21, 1995, abandoned, which is a continuation of application No. 07/705,473, May 24, 1991, abandoned.

[51] Int. Cl.[6] .................................................. H04N 5/76
[52] U.S. Cl. .................................... 386/83; 386/95
[58] Field of Search ............................ 386/46, 83, 95; 348/906, 731, 734

[56] References Cited

U.S. PATENT DOCUMENTS

| | | | |
|---|---|---|---|
| 4,193,120 | 3/1980 | Yello | 358/335 |
| 4,475,153 | 10/1984 | Kihara et al. | 364/145 |
| 4,488,179 | 12/1984 | Kruger et al. | 358/181 |
| 4,527,194 | 7/1985 | Sirazi | 348/731 |
| 4,626,909 | 12/1986 | Oniki et al. | 386/83 |
| 4,631,601 | 12/1986 | Brugliera et al. | 358/335 |
| 4,641,205 | 2/1987 | Beyers, Jr. | 358/335 |
| 4,703,359 | 10/1987 | Rumbolt et al. | 358/194.1 |
| 4,706,121 | 11/1987 | Young | 358/142 |
| 4,755,883 | 7/1988 | Uehira | 358/335 |
| 4,796,107 | 1/1989 | Hiraki | 360/33.1 |
| 4,847,696 | 7/1989 | Matsumoto et al. | 358/335 |
| 4,908,707 | 3/1990 | Kingborn | 358/147 |
| 5,016,273 | 5/1991 | Hoff | 358/194.1 |
| 5,056,070 | 10/1991 | Shibuya et al. | 386/46 |
| 5,123,046 | 6/1992 | Levine | 358/335 |
| 5,307,173 | 4/1994 | Yuen et al. | 358/335 |
| 5,335,079 | 8/1994 | Yuen et al. | 386/83 |
| 5,479,266 | 12/1995 | Young et al. | 348/734 |

FOREIGN PATENT DOCUMENTS

| | | |
|---|---|---|
| 2126002 | 3/1984 | United Kingdom . |
| WO07844 | 7/1990 | WIPO . |

*Primary Examiner*—Huy Nguyen
*Attorney, Agent, or Firm*—Christie, Parker & Hale, LLP

[57] ABSTRACT

According to the invention, a method for referencing schedule information of a television program comprises partitioning the information into first and second code segments, the first code segment having starting day and time information, and the second code segment having program identifier and length information. A system of the present invention comprises a VCR and a programming controller, the programming controller programming the VCR to record the television program according to the schedule information in the partitioned code.

7 Claims, 8 Drawing Sheets

Monday
8 PM – 9 PM

Program chart is on A-68
Pay-TV movie details begin on A-5

(NIK) MAKE ROOM FOR DADDY (BW) (910)
(NSH) YOU CAN BE A STAR—Talent Contest (830)
(SHO) MOVIE—Comedy; 1 hr., 40 min. ★★★ (971)
"Back to School."
(USA) RIPTIDE—Adventure; 60 min. (931)

8:30 ❸ ❹ ❻ VALERIE'S FAMILY (CC)
[182] An eager Willie and a reticent Mark ditch school for the day, but when Mark (Jeremy Licht) gets caught, Willie (Danny Ponce) feigns ignorance about the scheme. (Repeat)
❺ ❿ ⓯ DESIGNING WOMEN (CC) (051)
A redecorating job on a cruise ship finds Mary Jo and Suzanne (Annie Potts, Delta Burke) wagering on who will show up with the most eligible man at the captain's dinner. Claude: Charles Pierce. Trevor: John Furey. (Repeat)
㉜ ADAM SMITH'S MONEY WORLD (321)
Scheduled: The economics of the NBA, including the Boston Celtics' budget. (Repeat)
(CNN) SPORTS—Charles/Hickman (871)
(ESN) SPORTSCENTER (771)
(MTV) MONTY PYTHON'S FLYING CIRCUS (780)
(NIK) MISTER ED—Comedy (BW) (910)
(NSH) AMERICAN MAGAZINE (830)
Tips on organizing a child's room.

9 PM ❸ ❹ ❻ MOVIE (CC)—Comedy-Drama;
[184] 2 hrs. ★★ (031, 041, 081)
Loni Anderson and Perry King play fiercely competitive Madison Avenue execs who are "Stranded" on an uninhabited South Pacific isle while pursuing a prized client. A 1986 TV-movie filmed in Tahiti. (Repeat)
Supporting Cast
Pierson .................... William Hickey
Maxine ..................... Elaine Stritch
Phil ........................ Joel Brooks
Tommy ..................... Edward Winter
❺ ❿ ⓯ NEWHART (CC)
Buffy Denver (Julie Brown), Dick's effervescent former co-host, discovers that she and Stephanie (Julia Duffy) bubble in sync. Dick: Bob Newhart. Joanna: Mary Frann. (Repeat)
❻ OCEAN APART (CC)—Documentary; (063) 60 min.
"Here Come the British, Bang! Bang!" chronicles Britain's efforts to enlist America's aid during the early days of World War II.
❼ MOVIE—Drama; 2 hrs. ★★★★ (073)
"The Elephant Man." (Made for TV; 1982) Philip Anglim re-creates his role in Bernard Pomerance's prize-winning Broadway play about the hideously deformed John Merrick (1863-90). Kevin Conway, Penny Fuller. Ross: Christopher Hewett. Gomm: Richard Clarke. Alexandra: Glenn Close.
[Time approximate after baseball.]

| | Prime Time | | | | See Ratings | |
|---|---|---|---|---|---|---|
| | 9:00 (184) | 9:30 (185) | 10:00 (186) | 10:30 (187) | 11:00 (188) | 11:30 |
| ❷ | Garry Shandling | Tracey Ullman | News | | Magnum (0211-47) | |
| ❸ | Movie: To Heal a Nation (033) | | | | News | George M |
| ❹ | Movie: To Heal a Nation (043) | | | | News | Sports |
| ❺ | Movie: Who Is Julia? (053) | | | | News | CBS News |
| ❻ | Masterpiece Theatre (061) | | Masterpiece Theatre (061) | | Wives of Patrick | Wives of |
| ❼ | Movie: Turk 182! (073) | | | | News | Sports |
| ❽ | Movie: To Heal a Nation (083) | | | | News | George M |
| ❾ | Masterpiece Theatre (091) | | Story of English (091) | | Comedy Tonight | Monty Py |
| ❿ | Movie: Who Is Julia? (103) | | | | News | Comedy |
| ⓫ | Movie: Turk 182! (113) | | | | News | She's the |
| ⓭ | Movie: Turk 182! (133) | | | | News | Wrestling |
| ⓮ | Premios de la musica latina (Cont.) | | Siempre en domingo | | | |
| ⓴ | Movie: The Acorn People | | | | Maude | To Be An |
| ㉒ | Mystery! (221) | | Monuments to Failure | | | |
| ㉖ | Nichiyo Gekijyo (261) | | Fields Report | News | | Cosaman |
| ㉛ | Best of Gleason (Cont.) | | Gomball | | Women's Wrestling | |
| ㉜ | Frontline | | American Playhouse | | | |
| | Garry Shandling | Duet | Tracey Ullman | Werewolf | Dempsey & Makepeace | |

FIG. 5

VCR PROGRAMMING SYSTEM

This is a Continuation of application Ser. No. 08/392,273, filed Feb. 21, 1995, now abandoned, which is a Continuation of application Ser. No. 07/705,473, filed May 24, 1991, now abandoned.

BACKGROUND OF THE INVENTION

1. Field of the Invention

The present invention relates to video cassette recorders (VCR's) and, more particularly, to programming VCR's for unattended recording.

2. Description of Prior Art

Programming a VCR for unattended recording requires a user to follow a step-by-step procedure that is confusing and error prone. In particular, the detailed process of entering a start time, channel, date, length, and so forth prevents most users from learning how to program a VCR. As a result, the vast majority of VCR's cannot be used by their owners for unattended recording.

One of the earliest attempts at simplifying VCR programming is bar-code scan programming, as taught by Kihara et al., U.S. Pat. No. 4,475,153. The technique, however, has;

distinct disadvantages. For example, publishing a bar code for each TV listing proved to be a difficult task, due in large part to the increased complexity and size requirements. As a result, bar-encoded TV guides never became widely available. Without bar-encoded TV guides, users must follow a detailed procedure—scanning a start time, channel, date, and length from a pre-printed card. To date, there has been little interest in bar-code programming techniques.

There have been other attempts as well. A recording scheme based on the concurrent transmission of a program identifier is described by Breese in UK Patent Application GB 2 126 002 A. Similar techniques are described by others, e.g., Kruger et al. in U.S. Pat. No. 4,488,179. The program identifier is based on program codes available from media sources, such as teletext broadcasts and printed guides. More recently, U.S. Pat. No. 4,706,121 to Young discloses a "point-and-shoot" programming method which combines the input of schedule information with remote control of a programming apparatus.

Other attempts have been made at simplifying TV viewing and recording. For example, U.S. Pat. No. 4,755,883 to Uehira describes a removable input device for an electronic recording apparatus; U.S. Pat. No. 4,488,179 to Kruger et al. describes a TV viewing center having two tuners, one for a TV signal, the other for supplementary information; and U.S. Pat. No. 4,703,359 to Rumbolt et al. describes a universal remote control unit with model identification capability, the control including a learn mode.

The disclosures of each of the foregoing references are hereby incorporated by reference.

Perhaps the best-known program code programming scheme in the U.S. is a variation taught by Yuen et al., WO Application 90/07844. In the system of Yuen, a proprietary algorithm is used to compress start time, date, program length, and channel information into a multi-digit number, i.e., a compressed code. Specifically, Yuen employs a time-dependent recording method where a recording starts when a selected program schedule and a clock timer coincide. In the concurrent transmission scheme of Breese, in contrast, a recording commences when a concurrently transmitted program ID matches a selected program schedule or code.

The compressed codes of Yuen varying in lengths depending on the "priority" of a listing. High priority programs, such as primetime shows on popular channels, are assigned short codes. For example, a system which accommodates 128 channels, 31 day period, 48 half-hour start times, and 16 length selections requires seven digit to encode a total of 3,047,424 combinations. With compression, however, high priority listings can be represented in as few as two digits.

The compression technique of Yuen maps popular broadcasters to high priority numbers. For example, CBS may be mapped to the highest priority number of 0, NBC to 1, ABC to 2, and the like. Less popular broadcasters, on the other hand, are given low priority numbers, e.g., 131. Popular viewing times ("primetime") are also accorded high priority. For example, a start time of 6 p.m. may be mapped to the number 0, 6:30 p.m. mapped to 1, 7 p.m. mapped to 2; 4:15 a.m., on the other hand, is accorded a low priority number of 48. Program lengths are similarly mapped. For example, one-half hour is mapped to 0, 1 hours is mapped to 1, and so forth; 5 hours and 30 minutes, a low priority length, may be mapped to 16.

Dates, however, are not prioritized but require two digits for any day up to thirty-one days. Thus a program code is generated by simply combining the priority numbers for channel, start time, link, and date to form a multi-digit number. For a television program on CBS, a 6 p.m. start time, a program length of 30 minutes, and a date of the eleventh, the resulting compression code would be 0+0+11 or simply 11 (since leading zeroes are ignored). The disclosure of Yuen et al. is hereby incorporated by reference.

While the system of Yuen represents an improvement over prior techniques, the system has several shortcomings. In particular, the compressed codes create significant new problems. One problem, for example, is the "ballooning" of codes. While the average length of printed compressed codes can be held to about 6 digits, low priority program codes often dramatically increase or "balloon up" to more than twice the nominal digits, at times exceeding 20 digits. These codes, like barcodes, are difficult and expensive to publish. As a result, publishers often omit lower priority codes in order to conserve print space and minimize clutter. Thus, the system of Yuen provides a simplified programming scheme at the expense of viewers who watch "low priority" programs.

Due to the proprietary algorithm employed by Yuen, the compressed codes cannot be duplicated or improvised by the user. If a code is unavailable for a TV program, e.g., it has been omitted by the publisher or the TV program has been re-scheduled, the user must manually enter the TV program into the VCR or forego recording it altogether.

The varying lengths of the compressed codes create additional problems. With wildly varying lengths, the compressed codes are prone to transcription errors by publishers as well as VCR users. Furthermore, adjacent compressed codes can be very dissimilar and, thus, verification (e.g., digit count checking or adjacent codes comparison) is not readily available. While the system of Yuen can generate compact codes for TV listings, it also has many undesirable features which limit its usefulness.

Thus, it is desirable to have a system and methods which permits any user to program a VCR for unattended recording of any program regardless of priority. Furthermore, the system should not require pre-generated codes of varying or excessive lengths. The present invention fulfills these and other needs.

SUMMARY OF THE INVENTION

A system for VCR programming, in accordance with the present invention, comprises a recording device, a broadcast receiver, a processor for decoding the program codes and controlling the VCR and any related broadcast receivers, and an input means for accepting optimized program codes to select programs for unattended recording. The broadcast receiver may include any television signal receiving apparatus such as direct broadcast satellite (DBS) receivers, wideband integrated service digital network (ISDN), telecom receivers, cable decoders, and the like. Where the broadcast receiver is external to the programming apparatus, means to remotely control the selection of channels of the external receiver(s) is provided. The system may further include a television schedule system.

In a method of the present invention, schedule information is partitioned into two code segments. A first code segment defines the start time and day, and is independent of program-specific parameters. A second code segment specifies program parameters such as channel, length, frequency of broadcast, member of a series, and the like, but is independent of start time. The user enters the two codes separately at the time of programming.

In a method of decoding user-supplied information, a partitioned code is received from the user, the partitioned code including first and second code segments (as described above). A select digit(s) (or character(s)) is decoded by referencing a corresponding lookup table or map with the digit as an index into the table. In a similar manner, the remaining digits are decoded by referencing corresponding lookup tables. The decoded information may be processed for display and/or programming a VCR.

Since the functions represented by each code are independent, partitioning the program code, as taught by the present invention, provides many advantages. If a program schedule is delayed, for example, another start time code segment can be selected from the TV guide. In the absence of a program code, the code can be duplicated by most users. Furthermore, partitioned codes, in contrast to compressed codes, are easily proofread.

Partitioned codes of the present invention offer publishers a significant savings in print space when compared to compressed codes. In a one-week guide having 10,000 or more listings (not uncommon for guides with separate movie listings), for example, a savings of three digits per listing or 30,000 total digits can be realized over compressed code formats. This represents a savings of about eight pages per issue for a weekly publication. For large publications which typically have a $1,000,000 per page cost, such as TV Guide, this would translate into a savings of about $8,000,000 a year.

Unlike prior time-dependent recording methodologies, the present invention provides the ability to easily modify programming lengths. For example, the present invention accommodates last minute schedule changes as well as stopping the recording of a program of indeterminate lengths.

The system of the present invention may further include a television schedule system to provide timely schedule information. For example, a mini-series with irregular scheduling may be recorded with a single entry. The individual. programs of the series are linked so that they are automatically recorded. A television schedule system for delivering the required schedule information has been disclosed by Young, U.S. Pat. No. 4,703,121.

The present invention further includes means to control the ever increasing media options available to viewers. In operation, a logical channel identifier is maintained for each programming sources available to the viewer, with television signal selection tied to each identifier. Different television channels or carriers are automatically selected during viewing or unattended recording, the entire process being transparent to the viewer. Thus, programs selected for recording may be any combination of broadcast television carriers, cable television, Direct Broadcast Satellite (DBS), and the like.

Other objects and further scope of applicability of the present invention will become apparent from the detailed description provided hereinbelow. It is understood that the details and specific examples are given by way of illustration only, since various changes and modification may be made within the scope of the invention.

BRIEF DESCRIPTION OF THE DRAWINGS

FIG. 5 is a representation of a TV listing incorporating the partitioned program codes of the present invention.

DESCRIPTION OF THE PREFERRED EMBODIMENT

I. Preferred Systems

Figure 1:
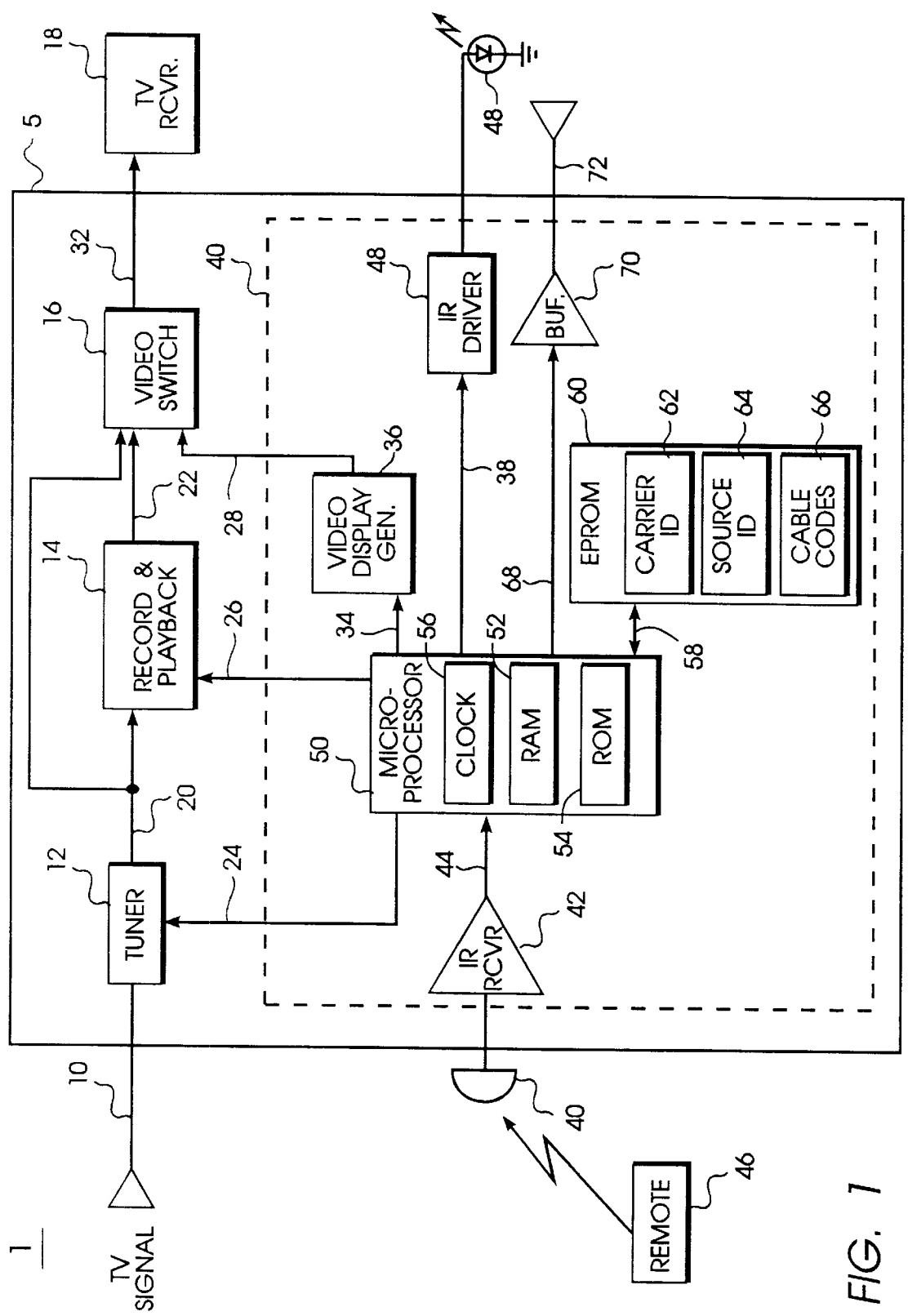
FIG. 1 is a block diagram of a system constructed in accordance with the principles of the present invention, the system including a VCR incorporating programming function.

Referring now to FIG. 1, a system 1 of the present invention comprises a video cassette recorder (VCR) 5 connected to a programmer controller 40. As illustrated, controller 40 may be disposed within recorder 5. System 1 further includes a remote controller 46 (e.g., an infrared handheld remote) for sending user commands to programmer 40 and VCR 5 from a remote location.

VCR 5 includes a tuner 12, a record/playback module 14, and a video switch 16. Tuner 12 is connected to record/playback module 14 via line 20, and also connected to video switch 16 via line 21. Video switch 16 also receives input from record/playback 14 and from a video display generator 36 of programmer 40. An output from video switch 16 is supplied to a TV receiver 18 by line 32.

Controlling programmer 40 comprises a microprocessor, a video display generator 36, IR receiver 42 and driver 48, an EPROM 60, and a buffer 70. Microprocessor receives input from IR receiver 42 via line 44 which is connected to an IR photodetector 41. In particular, user commands are transmitted from remote 46 to IR receiver 42 and then supplied to microprocessor 50 for processing. Microprocessor 50 receives additional input from EPROM 60 through line 58. In response to these inputs, microprocessor 50 controls several modules, including tuner 12 via line 24, record/playback module via line 26, video display generator via line 34, IR driver 48 via line 38, buffer 70 via line 68, and EPROM 60 via line 58.

The operation of system 1 requires the interaction of the components of VCR 5 with those of programmer 40. A plurality of TV signals or carriers are received by tuner 12 from TV source 10. Under the control of microprocessor 50 via line 24, tuner 12 selects one of the signals (channels) via remote 46. It will be appreciated by those skilled in the art that several signal sources are possible, and the invention is not limited to any particular one. Tuner 12, for example, may receive a plurality of signals from a wired cable, terrestrial antenna, satellite receiver, fiber optic video cable, and the like. During unattended recording (unattended program mode), however, tuner 12 is controlled by the programming function discussed hereinbelow. General VCR function, including record, playback, fast forward, rewind, and the like, are provided by record/playback section 14 which is under the control of microprocessor 50. Video switch 16 selects an input signal from record/playback section 14 or tuner 12. Switch 16 may also receive text and graphic output, such as on-screen messages and menus, from video display generator 36 which is also under the control microprocessor 50 via line 34.

Output from video switch 16, and hence output from VCR 5, is sent to TV receiver or monitor 18 via output line 32. The output may comprise standard audio and/or video signals. However, the output may further include additional signals, such as stereo, second audio program (SAP), high-definition TV (HDTV), and the like. If video switch 16 incorporates an RF modulator, TV 18 can be a conventional TV receiver.

Programmer 40 functions largely to control VCR 5.

The operation of programmer 40 is controlled by microprocessor 50 which includes a random access memory (RAM) 52, a read only memory (ROM) 54, and system clock 56 having time and calendar functions. System RAM 52, in addition to the usual system function such as variables, flags, and interim data created while executing program instructions, stores the schedule parameters decoded from each program codes entered. System RAM 54 storing common command instructions, such as instruction to control tuner 24, video display generator 34, receive commands from IR receiver 42, and outputs to IRF driver 48 and buffer 70. Additionally, RAM 54 stores data to decode the time/day and length codes, programming source names and logical channel identification codes for cable, DBS, ISDN telecom programming services, IR command codes for popular television apparatus, such as cable decoders, satellite receivers, VCR and other apparatus.

Programmer 40 is also provided with non-volatile storage means for storing schedule and television source information, customization data unique to each setup installation, channel (or satellite transponder) assignment information, and the like. In the embodiment of FIG. 1, the storage means is an EPROM 60 connected to microprocessor via bus 58. EPROM 60 is an erasable-programmable RAM or other non-volatile memory for storing schedule information not available to the system RAM 54. EPROM 60 comprises a carrier ID means 62 for storing a television carrier, a source ID means 64 for storing a program source ID (e.g., HBO) and names, and cable channels or codes means 66 for storing cable channel assignment codes. The schedule information may include, for example, the name of future cable television programming sources, such as "Encore." In this example, the text string "Encore" or an abbreviated version thereof is stored in the source code section 64 of the EPROM 60. The corresponding channel number is stored adjacent to the source code. Typically, this is entered by the user, or is received by the data decoder 212 (FIG. 3) from the cable system or other carrier. EPROM 60 may also store the name of new carrier services, such as ISDN, in the carrier ID section 62.

EPROM 60 may also store other information which is not provided in system ROM. For example, the IR (infrared) codes of the remote controllers for most popular brands of VCRs and cable decoders are provided in ROM. The user need only select his or her brand to be controlled. The user may purchase, however, a brand for which the IR codes are not known. In this case, the system "learns" the IR codes for the unknown controller, with each new code stored in EPROM 60 adjacent its command function. The training of a system to recognize the IR codes of an unknown device has been described by Ehler in U.S. Pat. No. 4,626,848, the disclosure of which is hereby incorporated by reference.

System 1 may include one or more television accessories, such as auxiliary tuners, signal processors, and the like. Buffer 70, controlled by microprocessor 50 via line 68, provides a wired signal 72 for selecting or controlling television accessories. This control capability allows the automatic recording of a plurality of television programming sources in a single unattended session. Thus, for example, a program on cable may be recorded followed by another on DBS without any user attendance. As another example, an A-B switch may be electronically-controlled using signal 72. An alternate embodiment where an A-B switch is controlled from an IR emitter is described hereinbelow.

Figure 2:
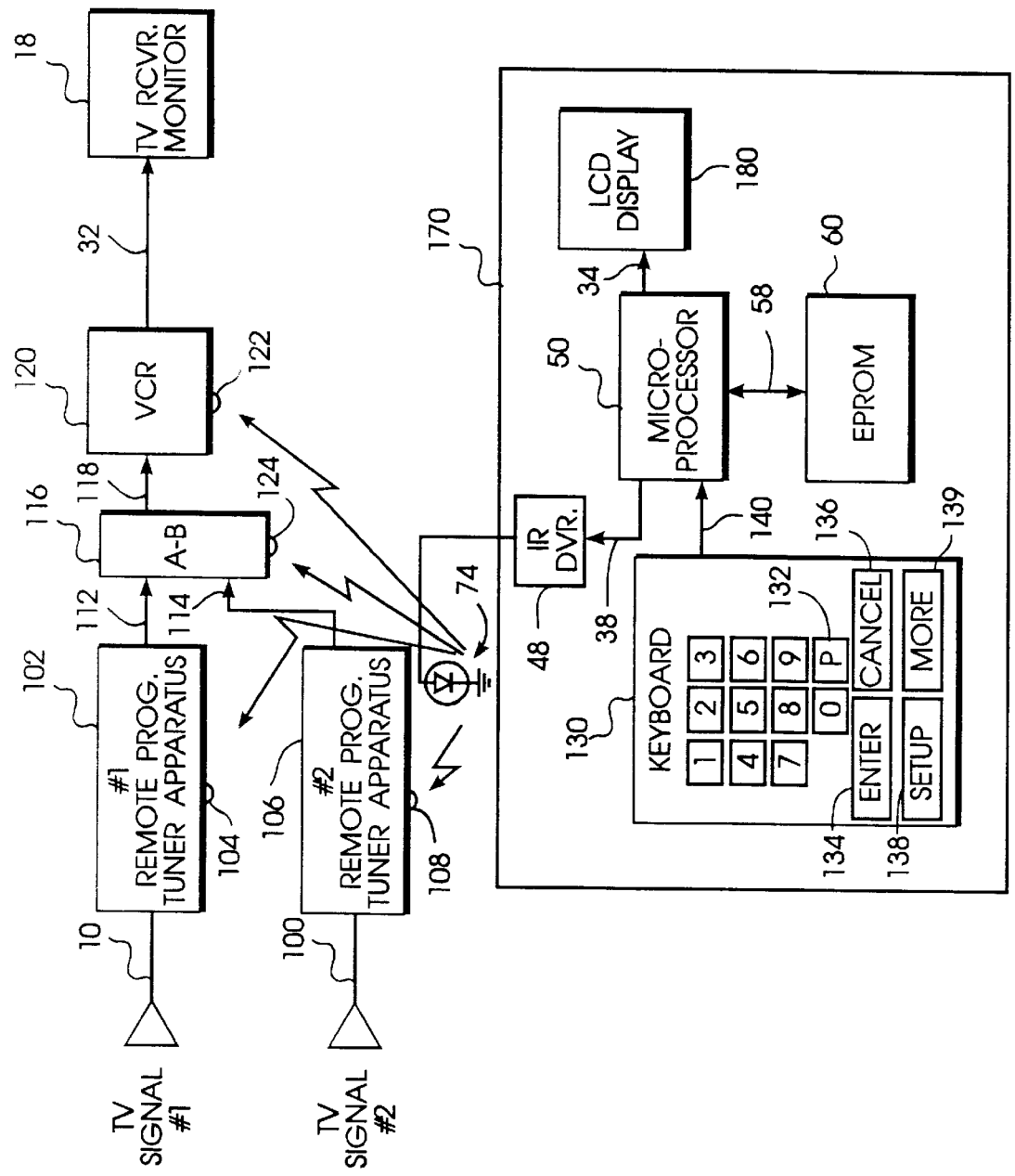
FIG. 2 is a block diagram of a system constructed in accordance with the principles of the present invention, the system including a remote controller incorporating programming function.

Referring now to FIG. 2, there is shown a system 2 having a remote controller incorporating programming functions. In particular, system 2 includes a remote controller 170 transmitting IR commands for controlling four devices, including a VCR 120, two remote programmable tuner apparatus 102, 106, and a remote selectable A-B video switch 116.

The remote programmable tuners 102, 106 include IR detectors 104, 108 for receiving IR commands and include means for receiving TV signals 10, 100. The TV signals may be from numerous sources, including a cable decoder, a DBS satellite receiver, a fiber optic telecom communication node, a wireless cable receiver, and the like. Through lines 112, 114, output signals (selected TV signals) from tuners 102, 106 are applied to A-B switch 116. Switch 116 includes an IR detector 124 for receiving an IR command to select a single output signal for a given period of time. VCR 120, which also includes an IR detector 122, receives the one selected signal from switch 116 via line 118. Output from VCR 120, in turn, is supplied to TV receiver/monitor 18 via line 18.

In the embodiment of FIG. 2, remote controller 170 effectively replaces the internal programming facilities of VCR 120. Remote controller 170 includes microprocessor 50 connected to liquid crystal display (LCD) 180, EPROM 60, keyboard 130, and IR driver 48. In operation, microprocessor 50 receives user commands from keyboard 130 via line 140. Keyboard 130 includes a numeric pad 132 as well as defined function keys, such as an Enter key 134, a Cancel key 136, and a SETUP key 138, for entering information. Immediate user feedback is provided by LCD display 180 which communicates with microprocessor 50 through line 34. From line 58, microprocessor 50 retrieves infrared emulation codes stored in EPROM 60, thereby allowing controller 170 to communicate with any apparatus regardless of make or manufacturer. Through line 38, the codes are sent to IR driver 48. Proper IR output signals are determined and then emitted by IR emitter 74. Remote controller 170 is positioned so that its IR output signal is visible to infrared input ports 104, 108, 122, 124 of television apparatus 102, 106, 116, 120.

It will be apparent to one skilled in the art that alternatives exist to the embodiment of FIG. 2. If the only apparatus to be controlled in the embodiment is VCR 120, for example, tuners 102, 106 and A-B switch 116 may be omitted, and TV signal 10 would be supplied directly to the TV input of VCR 120.

Figure 3:
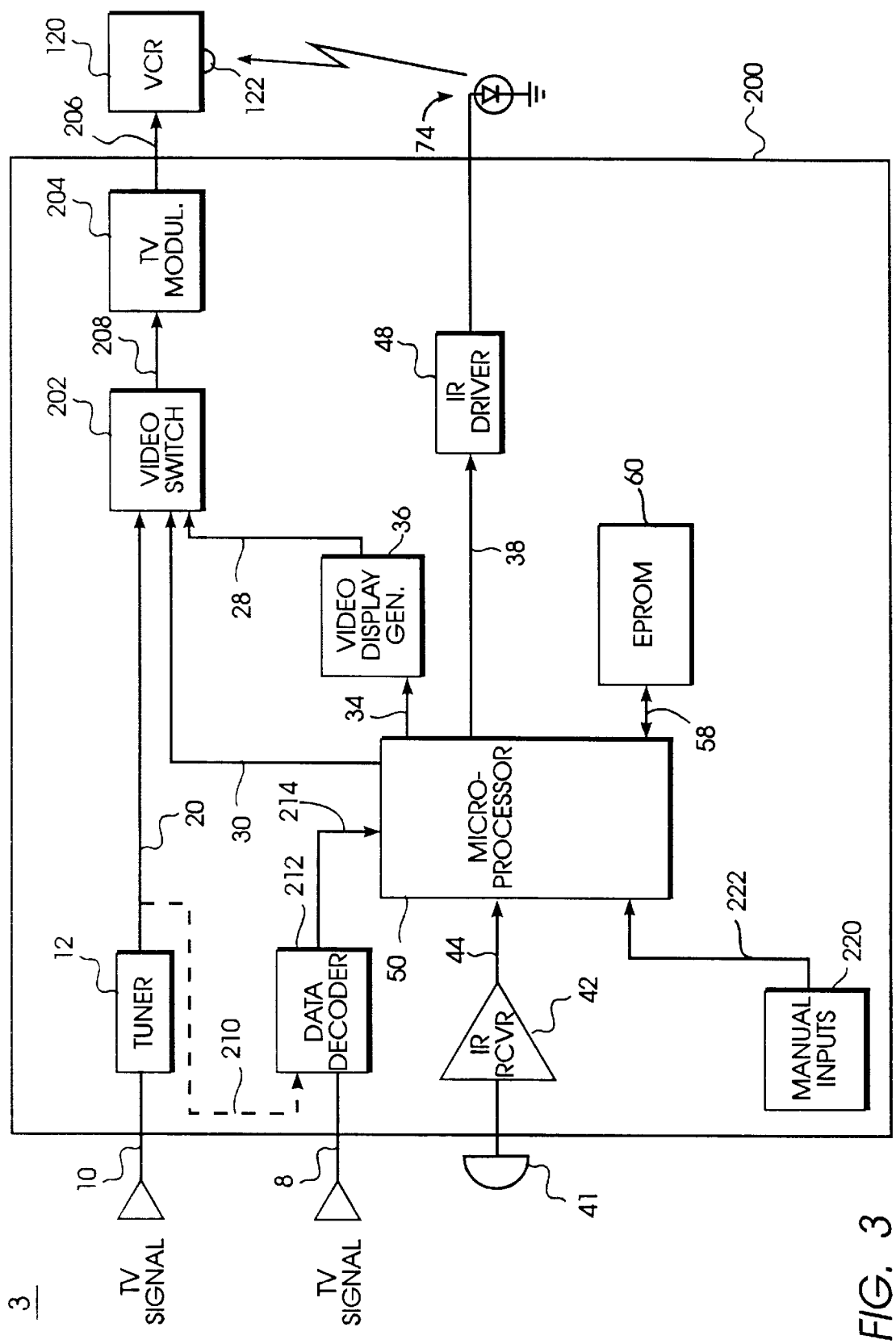
FIG. 3 is a block diagram of an advanced programmer system constructed in accordance with the principles of the present invention, the system including a data decoder for receiving schedule information.

Referring now to FIG. 3, there is shown a system 3 including a remote tuner system 200 and a VCR 120. In this embodiment, VCR 120 is of conventional design with remote control input 122 functions. Tuner system 200 includes a TV modulator 204 connected to a video switch 202 via line 208; video switch 202, in turn, receiving signals from tuner 12 via line 20, microprocessor 50 via line 30, and video display generator 36 via line 28. Tuner 12 receives TV signal 10 as its input.

Tuner system 200 further includes an advance programmer or data decoder 212, such as a cable decoder, which receives a second TV signal 8 or selectively receives the output of tuner 12 via line 210. TV signal is received by system 200 through tuner 12 via line 10 or data decoder 212 via line 8. Data decoder 212 may also be used to receive television schedule information. Output from decoder 212 is supplied to microprocessor 50 via line 214.

Schedule data is provided to microprocessor 50 through one of several means. In a cable system, for example, TV signal 8 (which may be connected to TV signal 10) may include a data channel. In this case, data decoder 212 is the same hardware used for receiving addressable data for enabling cable decoders. Alternatively, the schedule information may be transmitted over the vertical blanking interval (VBI) line of one or more broadcast channels. In this case, data decoder 212 may be a closed-caption decoder connected to the output of tuner 12 through line 210. The use of VBI to carry digital data is known in the art; see, for example, U.S. Pat. No. 4,703,121, issued to Young, the disclosure of which is hereby incorporated by reference. The data decoder 212 may also receive its signal from other carriers such as a wideband telecom cable.

In response to information provided by microprocessor 50, video switch 202 selects between the tuner output 20 or programming menu and messages provided by video display generator 36. Microprocessor 50 is also connected to an infrared receiver 42 and a manual input means 220. Infrared receiver 42 provides a user interface to set up an unattended recording; selections are made in response to signals from infrared input 41. Alternatively, an unattended recording may be programmed using manual input 220. Manual input 220 is a keyboard or other data entry means, and may be conveniently located on a front panel of the programming system. It performs essentially the same functions as keypad 130 (FIG. 2).

In response to information from microprocessor 50, infrared driver 48 and emitter 74 transmit remote commands to prepare VCR 120 for recording. RAM 54 and EPROM 60 stores IR codes (as discussed hereinabove) for emulating the IR command necessary to communicate with VCR 120. Specifically, RAM 54 stores IR code look-up tables for popular VCRs and cable decoders, and EPROM 60 stores an IR code look-up table for models not included in the RAM 54. Recording begins by transmitting IR codes to set the tuner of VCR 120 to an available channel to match the channel of RF modulator 204. Next, a start record IR command follows, and at the end of the recording period a stop IR command is sent to the VCR 120.

Common to each embodiment is the programming function: block 40 of FIG. 1, block 170 of FIG. 2, and block 200 of FIG. 3. The user remote controller may include a keyboard similar to keyboard 130 of FIG. 2 for inputting the programming selection. Programming function 40 of FIG. 1 includes microprocessor 50.

II. Partitioned Program Code Method

Figure 4:
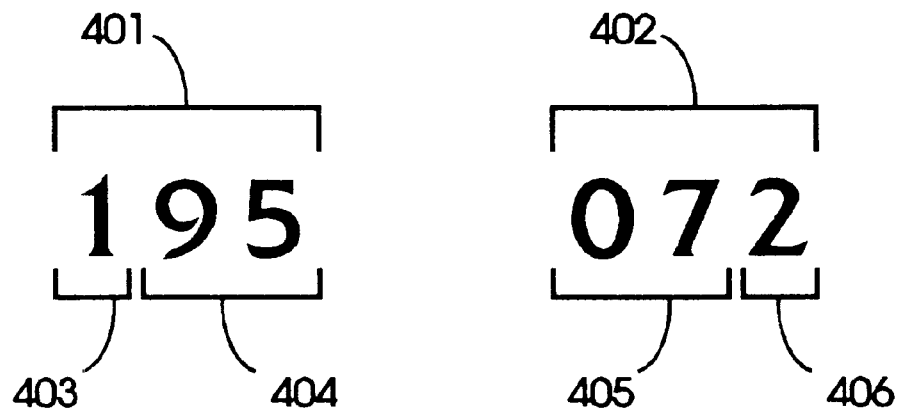
FIG. 4 illustrates the components of a partition code of the present invention.

Referring now to FIG. 4, a program code method of the present invention comprises partitioning programming information into a first code segment 401 defining the start time and day of the program and a second code segment 402 specifying, at least, the program source and program length. It will be appreciated by those skilled in the art that different combinations of alpha and/or numeric characters may be employed, and the present invention is not limited to any particular combination.

In partitioning programming information into the first code segment 401, the start time and day are specified by a first code segment of alphanumeric characters. In one embodiment of the method, the first code segment comprises three digits and defines the starting time to the nearest 15 minutes for ten days. This yields 96 start times per day (96*15 min.=24 hrs.). The start time is represented in units of time, e.g., 15 minutes, by the two contiguous digits or start time digits 404; as shown, these may be the rightmost digits. For start time expressed in 24 hours, for example, the start digits 404 are determined by multiplying the start time by 4 and dropping any fractional result (mantissa) that occurs. Alternatively, using three digits, the start time can be defined to the nearest 30 minutes, out of 20 days. The day of the week for the next nine days are represented by the a remaining digit or day digit 403, with the first Sunday assigned as day 0; as shown, the day digit is the leftmost digit. For purposes of illustration only, exemplary first code segments are given below:

| Start Time | Day | First Code |
|---|---|---|
| 12:00 PM | Sunday | 000 |
| 12:00 PM | Monday | 100 |
| 11:45 PM | Monday | 195 |
| 12:00 PM | Tuesday | 200 |
| 12:30 PM | Saturday | 602 |
| 1:00 PM | Sunday | 752 |
| 1:00 AM | next Tuesday | 904 |

With this standardized determination, any missing time code may be duplicated by examining a program-coded TV guide.

In partitioning programming information into the second code segment 402, a programming source (commonly referred to as a channel) and a program length of time are specified by a second plurality of alphanumeric characters. For a three digit embodiment, for example, up to 100 programming sources are specified by the two contiguous digits or programming source (source ID) digits 405; as shown, these are the leftmost two digits. The remaining digit or program duration digit 406 specifies the duration of the program. Thus, a complete program code requires entry of 6 digits—the equivalent of an uncompressed code. From the foregoing schedule parameter, there are 768,000 combinations (100 channels*96 start time*8 lengths*10 days), and each listing may be represented by the 6-digit number of the partitioned code method.

Second code segment 402 may include additional information including the frequency of occurrence (e.g., daily, weekly, etc.), the program length even if indefinite, the television carrier(s), and whether the program is a member of a linkable series. For example, second code segment 402 may be expanded to four, five, six or more digits for representing expanding programming services, such as DBS, proposed telecom pay-per-view programming, or advanced VCR recording features. With a total of four digits in the second segment, up to 300 programming sources may be accommodated. The fourth digit (or additional digits) may also represent a prefix for advanced VCR programming options.

Traditionally, printed TV guides list programs either by terrestrial TV station ID (e.g., channel 5) or by abbreviated cable programming names (e.g., HBO). In the method of the present invention, terrestrial station ID's are inserted into the code without modification. Since the user interface is limited to numeric entries only (using a ten key pad), each cable programming name must be given a numeric name. This number is inserted into the printed code without modification.

All named programming sources are assigned a logical channel designation. For example, SHO may be logically identified as 97, TNT as 87, etc. Channels for other television carriers are also given a similar logical identifier. In the present method, physical channel numbering (assigned by cable companies) and the physical television carrier (i.e., the mode of transmission) are transparent to the user. "Carrier," as understood by the present invention, refers to entities that are licensed by the FCC to deliver video information. For example, Viacom and TCI are cable system carriers; DBS, on the other hand, is a satellite carrier. As there is an ever increasing multiplicity of carriers, it is not uncommon for a user to subscribe to multiple carriers, for example, more than one cable carrier, a satellite carrier and a cable carrier, and the like. Not only must TV Guides indicate the source of a program (e.g., HBO), but they must also indicate the carrier as well. Accordingly, carriers are assigned a carrier ID number. In the present invention, therefore, programming sources and carriers are identified by logical channel designations and carrier ID numbers, respectively. An assignment map is stored in EPROM 60 relating to the two channel numbers. The assignments may be made either manually by the user or automatically by the system. The transformation from logical channel to a physical channel is made at the time the program code is entered, or at the time a recording is started.

Physical channels are the channel assignments made by cable systems, typically on a priority basis determined by the cable system owner. It is advantageous for a TV source, such as HBO, to be located at a low channel number where people tend to watch most. As a result of competing financial interest, physical channel assignment of sources has been somewhat less than uniform across the U.S.

To correct this inconsistency, therefore, logical channel numbers are employed by the present invention to assign each source a standard channel number that applies anywhere in the U.S. Logical channel numbers may be entered in a variety of ways. Using an alphanumeric keypad and display, for example, a user may enter the literal name of the source (H-B-O for HBO). A numeric system, on the other hand, may be employed here each TV source is assigned a unique numeric ID that is the same across the U.S.

Logical channel numbers greatly simplify the task of TV guide publishers. TV guides for metropolitan areas typically cover numerous cable systems, with each system having its own physical channel assignment. The TV guide publisher must either publish numerous channel columns before each listing, or publish a complex conversion table. Either approach is wasteful. By assigning logical channel numbers to each source, the present invention permits a generic TV guide, where the actual physical channels are transparent to the user. Conversion from logical to physical channels is done automatically, for example, by referencing a look-up table in EPROM 60. It will be appreciated by those skilled in the art that other logical channel assignments may be made within the scope of the present invention.

The duration of the program length is represented by program duration digit 406. In the method of the present invention, various program lengths are encoded into a single digit. For the first four hours, length resolution is defined to be 30 minutes. After the fourth hour, the resolution declines to 1 hour. Thus for length of up to four hours, digit 406 is determined by the following Length subcode:

Length subcode=Length/30−1;

and for length greater than four hours:

Length subcode=Length/60+3;

where Length is in minutes. Any remaining fractions are rounded up, and negative results are rounded to 0. A code of 9 is defined as an indefinite record, in which case VCR 120 records until the end of the tape. Programs of indefinite length, such as most live sport events, are encoded with a safety margin. For purposes of illustration only, exemplary second code segments are given below:

| Channel | Length (minutes) | | Second Code |
|---|---|---|---|
| 2 | 30 coded as | 0 | 020 |
| 7 | 90 | 2 | 072 |
| 44 | 150 | 4 | 444 |
| 44 | 240 | 7 | 447 |
| SHO | 300 | 8 | 978 |
| TNT | 360 | 9 | 879 |

III. Advanced VCR Programming

In a preferred method, second code segment 402 is limited to 3 digits. A plurality of digits may be appended to the second code segment, however, to support more programming sources. For example, a fourth digit may be appended to the second code segment to support up to 300 programming sources and advanced programming features. Some of these features requires the addition of a broadcast television schedule system as described earlier.

A particularly advantageous advanced programming feature which may be implemented is automatic termination of a program of indefinite length. Often programs, such as sporting events, do not have a predetermined length. The VCR user must either add a "guard time" (i.e., increasing the programming time) or risk not recording the end of a program. In the TV schedule system of the present invention, therefore, microprocessor 50 may receive a concurrently broadcasted signal indicating the end of the program. The signal may be transmitted during the VBI signal by the broadcaster. Alternatively, a series of signals may be transmitted during the program indicating the best estimate of the ending time for that program. An hour before the scheduled ending of a program, for example, a signal may be indicating that the program will terminate in one hour. As the ending approaches, the transmitted signal is updated to more accurately reflect the ending time. By constantly updating the status of the program, the repetitive transmission method may prove more reliable than a single terminate signal method. The use of a TV schedule system having a concurrently broadcasted TV signal is described in U.S. Pat. No. 4,706,121, issued to Young.

When timely schedule information is available, advanced programming features such as linking of irregularly-scheduled series and automatic termination of indefinite length programs can be supported. For example, representative coding of the fourth digit may be defined as follows:

| Digit | Specification |
|---|---|
| 1 | first group prefix to special features |
| 2 | first group, daily M–F |
| 3 | first group, once a week |
| 4 | second group prefix to special features |
| 5 | second group, once |
| 6 | second group, daily |
| 7 | second group, once a week |
| 8 | third group, etc. |

An example serves to illustrate this feature. A second partition code of 020 represents channel 2, 30 minutes, and record once. The second partition code is modified to indicate additional programming parameters as follows. If in the foregoing example, the program is broadcasted five days a week, a fourth digit may be added to the second partition code to indicate this information, for example, 0202. The new digit 2 instructs the programming device to record the program daily from Monday to Friday. If the program is to be recorded once a week, the code is 0203, the digit 3 indicating that it is a weekly series. If the program is linkable, e.g., a mini-series, the code is 0201, the digit 1 indicating that the next series of digits encodes linking information.

Other advanced programming features may be provided. If a program is on channel 102 and has a length of 30 minutes, it may be encoded with a second partition code of 0205. The digit 5 represents that the channel 02 is from the next 100 channel group (i.e., 100 to 199). The digit 5 also indicates that the program is to be recorded only once. If the program were on channel 202, on the other hand, then the second partition code would be 0208, the digit 8 indicating the channels from 200 to 299. Thus in the foregoing example, the first group specifies information for the first 100 programming names, the second group specifies programming information for the next 100 programming names, and so forth.

Advanced recording features, such as linking and automatic termination, may be encoded by the forth digit. Linking is the processing of chaining or linking together irregularly schedule programs that do not fall into daily or once weekly predictability, e.g., mini-series and episodic sports events. Automatic termination is halting the recording of a program having an indeterminate length (as described hereinabove). A program that is linkable or has auto-termination is followed by a two digit program ID number.

This technique is best described with reference to an example. As set forth in the preceding example, a program on channel 2 that runs for 30 minutes is given a code of 020. If this program has a special feature, the digit 1 is appended to the code, i.e., the code is 0201. During any given week, there is a limited number of programs that are selected for automatic linking. IDs for each are arbitrarily assigned. Thus, if the program were assigned a series ID of 45, the completed second partition code would be 020145. Once entered within the programming system, i.e., stored within RAM 52, the data decoder 212 monitors the VBI lines of TV signal 8 for the same identifier. Upon finding a matching identifier, the data decoder 212 accepts the next incoming data stream as the schedule information for the next program of this series.

Unlike other program ID methods where every program broadcast on a channel is assigned a unique program ID, only certain high priority programs are assigned program ID's. When a link series or indefinite program is over, the program ID number is retired and recycled for use again in the future. Last minute changes in TV schedules, link ID codes and link-related program schedules, and auto-termination commands for indefinite length programs are provided by a television schedule system which receives timely schedule information, as disclosed in U.S. Pat. No. 4,703,121, the disclosure of which is hereby incorporated by reference.

Referring now FIG. 5, there is shown a TV listing 500 incorporating the partitioned program codes of the present invention. Near the start times of TV programs, first code segments 501, 502, 502a, 503 are displayed. Similarly, second code segments 510, 511, 530 are displayed proximate the individual TV programs. To construct the code for "Mystery!", for example, the view selects first code segment 502a and second code segment 512, thus yielding the code segment of "184 221". This code segment is then programmed into a VCR. TV listing 500 is suitable for display on TV receiver 18 by video display generator 36. A hardcopy of listing 500 may also be provided, e.g., in the form of a TV or cable guide.

In listing 500, linkable series are represented as follows. Entry 530 is the second partition code for a linkable series, Magnum. While the code could be represented as 021147, it will generally be more readable to hyphenate it, e.g., 0211-47. The following is a representative second code, where the program ID for a link program may be 20 to 70, and for indefinite length programs, the program ID may be 80 to 99.

| 2nd Code | Representation |
|---|---|
| 2931 45 | Channel 29, link ID is 45. |
| 3141 89 | Channel 31, indefinite ID is 89 | where the link ID is the arbitrarily assigned identifier for the linkable program and the indefinite ID is an arbitrary number or character identifying programs of indefinite links. The indefinite ID is also sought by the data decoder 212. If a matching ID is detected, then the next data stream represents the best estimate of ending time for the current program.

If the user omits the last two digits during programming, linking or indefinite termination is automatically ignored.

IV. Transmitted Schedule Information

In order to support advanced features, such as linking and automatic loading of channel assignments, timely schedule information is provided to the programming apparatus. In the embodiment of FIG. 3, data decoder 212 receives schedule information that is either contained in the VBI signal of a broadcast (input from line 210), or from a separate RF carrier (TV signal 8). For VBI data, the data decoder and data format may be based on closed-caption technology. For RF carrier data, the data receiver may be based on addressable cable decoder technology. In either case, the following is a representative set of schedule data delivered, either continuously or during specific times of the day, to the data decoder:

A. Link Schedule Information.

When a link program is selected, its link ID code is extracted and stored in RAM memory 52. The schedule data received by data decoder 212 is compared with the link ID code by microprocessor 50. When a match is detected, the succeeding schedule is copied to a record buffer in RAM memory 52. For a link program with a link ID of 45, the transmitted data format may be:

LINK 45 192-441, LINK 45 288-441.

Or, alternatively:

LINK 45 192-441 Alexander the Great, . . .

where LINK indicates that the next string is a link schedule for link program 45. The first link schedule 190-441 indicates Monday at 11:00 PM on channel 44 for one hour, while the second program is on Tuesday at 10:00 PM. In the second example, the name of the program is included in the link data. When a match occurs, the name is stored in RAM 52 adjacent the link ID number, providing name capability whenever the link program buffer is reviewed. LINK ID codes in memory 52 are automatically purged when the link series expires. At the end of a series and before recycling the link code for a new series, a series of LINK ID DELETE commands are transmitted. In particular, the LINK ID DELETE commands are transmitted by the broadcaster via TV signal 8 and received by data decoder 212 before processing by microprocessor 50.

B. Automatic Termination Signal

High priority indefinite length programs, e.g., live sports events popular networks, may be terminated at the actual conclusion of the event by transmitting a running terminate command. As with link, the indefinite length program ID is copied to RAM 52, when the program code is entered. The data transmission will transmit the following commands during the length of the broadcast:

END 89 T1, END 89 T2, . . . END 89 T77, etc.

where END indicates that the next two digits comprise the ID of the indefinite length program, and T1, T2, T3 . . . Tn represents the estimated time to conclusion of the program as the game progresses. T1 may be 240 minutes at the start of a football game, and T89 may be 5 minutes to the expected end of the game. Alternatively, the actual time in minutes may be encoded, for example, T15 representing 15 minutes remaining, and T0 representing the end of the program.

This running estimate provides a more error-tolerant termination than a single terminate command, ensuring definite termination of the program even though several END commands were not received. In the event that none of the END commands are received, recording time will default to the length designated in the program code.

C. Update Schedule

Last minute schedule changes is included in the transmitted schedule data. One or two days before a program selected for unattended recording is due, the transmitted data is monitored for a schedule that matches the selected program. If a match is found, the new schedule which follows the first code is replaced by the old schedule. A representative data format follows:

UPDATE 321-445 334-445, or simply UPDATE 321-445 334;

where the start time and day, 321 is changed to 334. The second code, which is program dependent, is unchanged.

D. Channel Assignment

To simplify setup of the programming apparatus 40, cable assignment data specific to the user's local cable company is transmitted daily. A similar set of data is transmitted for other television services, such as DBS, and wideband telecom. A typical assignment format is:

CABLE 34 12, CABLE 35 18, CABLE 36 76, etc.

or alternatively:

CABLE CNN 34 12, CABLE DISC 35 18, etc.

In the first example, the logical channel number 34, designating CNN, is assigned to cable channel 12. In the second example, the name of the programming service is also transmitted for clearness.

E. IR Code Emulation Information

As new remote television apparatus becomes available, information describing new infrared codes are transmitted, typically by the broadcasters, with the schedule information. This allows the user to remain compatible with new products by simply entering a product code ID obtained from a list of new models. Data decoder 212 monitors the transmission and automatically stores the set of emulation codes for the new product.

V. Operation of the Programmer

Figure 6A:
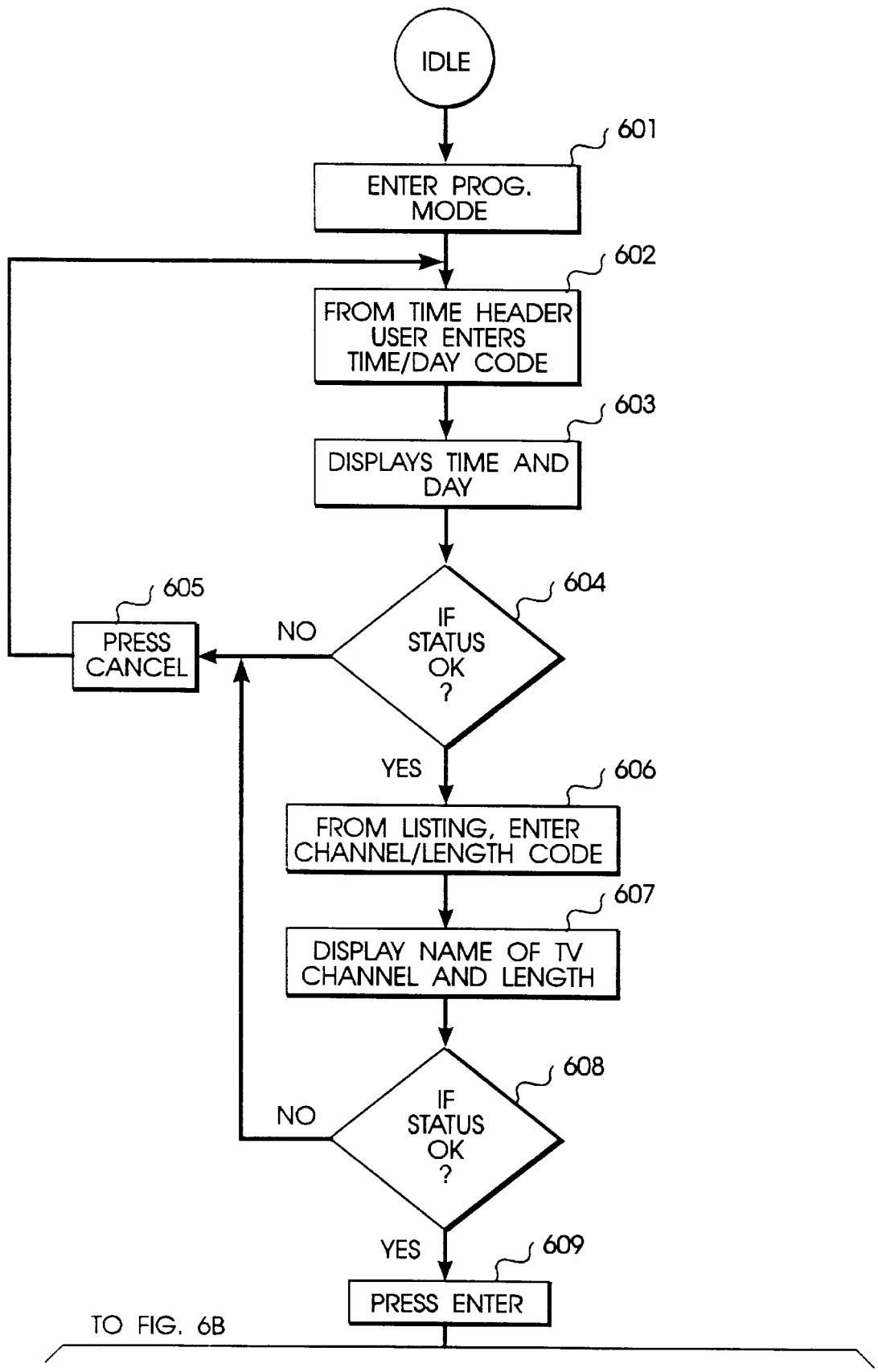
FIG. 6 is a flow diagram of a user interface of the present invention.
Figure 6B:
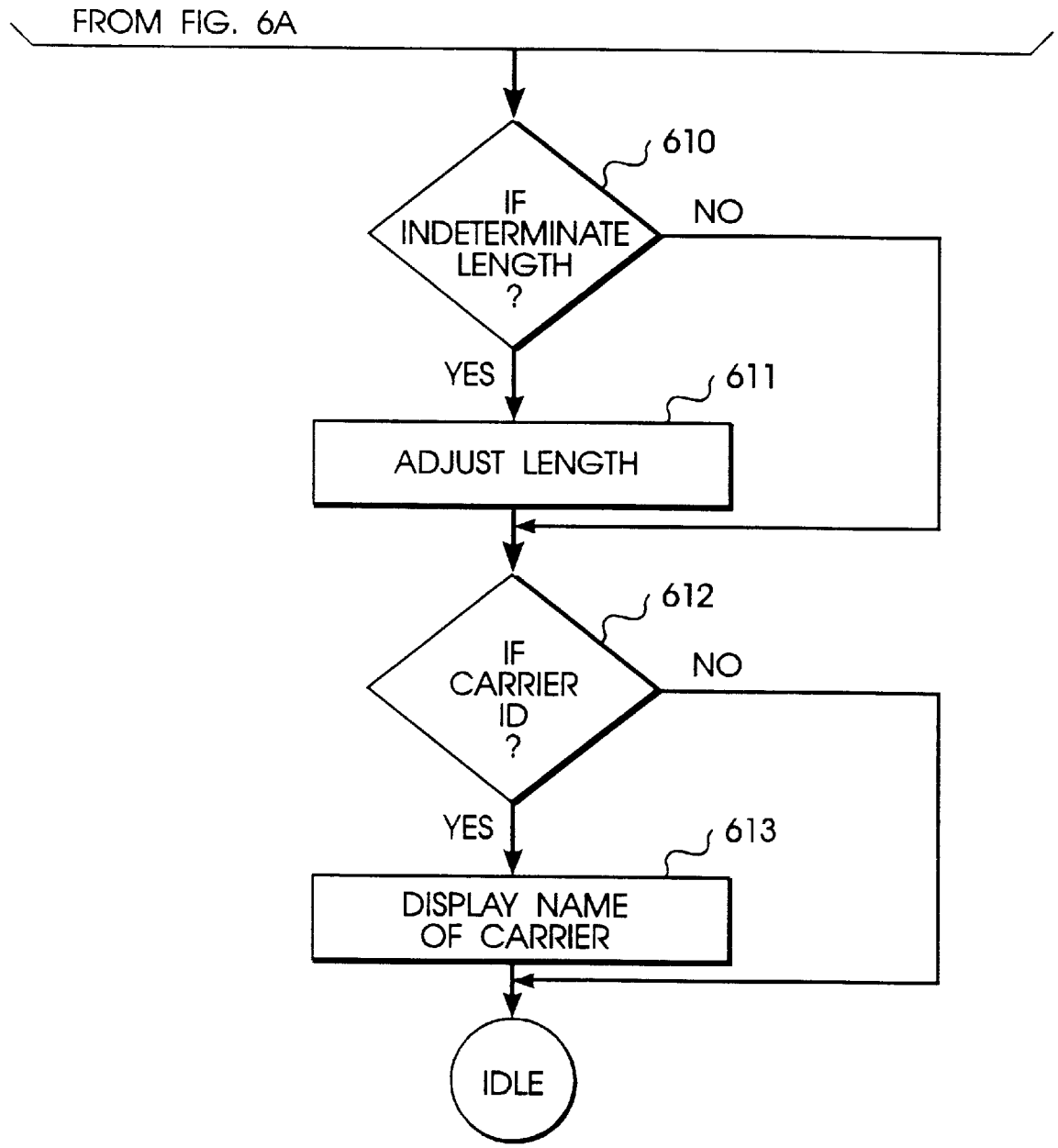

Referring now to FIG. 6, programming VCR 120 with a desired TV program is described. In step 601, programmer 40 is placed in a program mode. This may be done, for example, by activating a switch on the remote controller, thereby altering the infrared code commands of the ten-key pad to produce signals that represent program codes. Alternatively, a preface key (P key 132 in FIG. 2) may be pressed to signal the VCR to accept the next series of numeric commands as program codes.

Next, the user enters the appropriate partitioned code. In step 602, the first code segment specifying the time and day of the program is entered. The first code segment (e.g., 503 of FIG. 5) is read from the time header of the listing of the desired program. After the first code segment is entered, it is immediately verified and displayed in step 603. Programming apparatus 40 displays the start time in the traditional AM, PM format and the day of the week. If there is an error (step 604), the user may press "cancel" at step 605.

In step 606, the second code segment specifying the channel or source identifier and the length of the program (e.g., 510 of FIG. 5) is entered. As shown in FIG. 5, the second code segment is printed with the text of the program listing. After the second segment code is entered, the complete schedule, e.g., the channel code for the name of the source, such as TNT, and the length of the program in minutes, are displayed for final verification in step 607. For example, in an environment with both cable and DBS this might appear as:

752-441 Sun 1:00P, TNT, Ch. 44, Cable, 60 minutes.

752-871 Sun 1:00P, TYT, Ch. 12 DBS, 60 minutes.

If the information is correct at step 608, the user confirms, for example by pressing "Enter" at step 609.

If the digit code represents an indefinite program in step 610, i.e., timely television schedule information is not available, then in step 611 the user may add more time by pressing the More key (FIG. 2, 139). The following message is displayed:

"This program is scheduled for 4½ hours. Press More for each additional 30 minutes of recording time."

If there is a fourth digit in the second code segment, the user is may enter a special programming mode. If the digit code represents a regularly-scheduled series, the following verification message is displayed:

"This will be recorded daily. Press Cancel once to record current program only."

or:

"This will be recorded once a week. Press Cancel once to record current program only".

If the carrier ID exists at step 612, then in step 613 the name (or ID) of the broadcast source is displayed together with the length of the desired program presented in minutes.

After step 613, the schedule information is transferred to memory. Clock/timer 56 is monitored by microprocessor 50 for a time coincidence, whereupon VCR recording commences. The tuner channel is set to the selected program, and a recording for the duration of the length parameter is undertaken.

VI. Setup and Installation

The programming function is configurable to be compatible with the television environment. This is performed by pressing the SETUP key 138 of FIG. 2 and selecting an installation function. Programming sources and carriers in the viewer's environment are registered. Next, the user assigns any control signals required to select on enable each carrier.

For example, control line 72 of FIG. 1 may be used to enable the DBS receiver as taught by U.S. Pat. No. 4,703, 359; the disclosure of which is hereby incorporated by reference. The user first positions the IR driver emitter 74 in front of the VCR or cable decoder. He or she then selects the SETUP command. Microprocessor 50 retrieves a pair of IR codes (stored in RAM and/or EPROM) representing channel 12; these are transmitted by the IR emitter. Codes for all models stored in memory are sent out. Since IR remote receivers only respond to matching codes, nothing happens from the users perspective until the appropriate code is transmitted. Upon transmission of the correct code, the VCR or cable decoder channel indicator displays channel 12. In response, the user presses the Enter key to confirm identification of the model. The corresponding code set is then flagged for future use. Thus, during one programming session a mixture of program codes, such as DBS, cable, and the like, can be scheduled for unattended recording.

A. Channel Assignment

For cable users, channel assignment may be manually made at this time. A list of pre-programmed sources and carriers is displayed. After each source name (e.g., HBO) that is available, the user enters the physical cable channel number. If a data decoder is available, the cable channel assignment information will be provided with schedule information.

After the pre-programmed sources are completed, new sources may be added. In this case, a logical ID for the new source may be found in a printed guide. For example, YTY may be a new DBS programming service identified as 181 in the guide. After entering 181, the user enters the transponder channel assigned to YTY.

B. Additional Carriers

If there is an additional television carrier, logical channel assignments for it is made. Typically, the assignment table will show:

| Logical Channel No. | Carrier | Control |
|---|---|---|
| 2 | cable | |
| 46 | cable | |
| 87 | DBS | 1 |
| 88 | DBS | 1 | where control 1 is the signal line 72 of FIG. 1. Here, it is used for selecting a signal source on an electronically controlled A-B switch as shown in FIG. 2. Using this assignment, whenever logical channel 87 or 88 is selected, control 1 will automatically select the signal from the DBS receiver. This control may also be used to turn-on the DBS receiver.

C. Remote Programmable Tuner Apparatus

If there is a remote programmable tuner apparatus to be controlled, the programming function will emulate the IR code for the tuner. When this setup is selected, a test suite of IR codes is automatically generated. A series of channel select commands, e.g., twelve channels, for all known television apparatus are issued. When a correct pattern is seen on the channel indicator of the apparatus, the user responds by pressing the Enter key.

Thereafter, that code set will be used whenever the channel for that television apparatus must be changed for VCR programming purposes. To maintain compatibility with future television remote apparatus, the IR emulation information may be provided by data transmitted with the television schedule information.

VII. Method of Decoding Partitioned Codes

Figure 7:
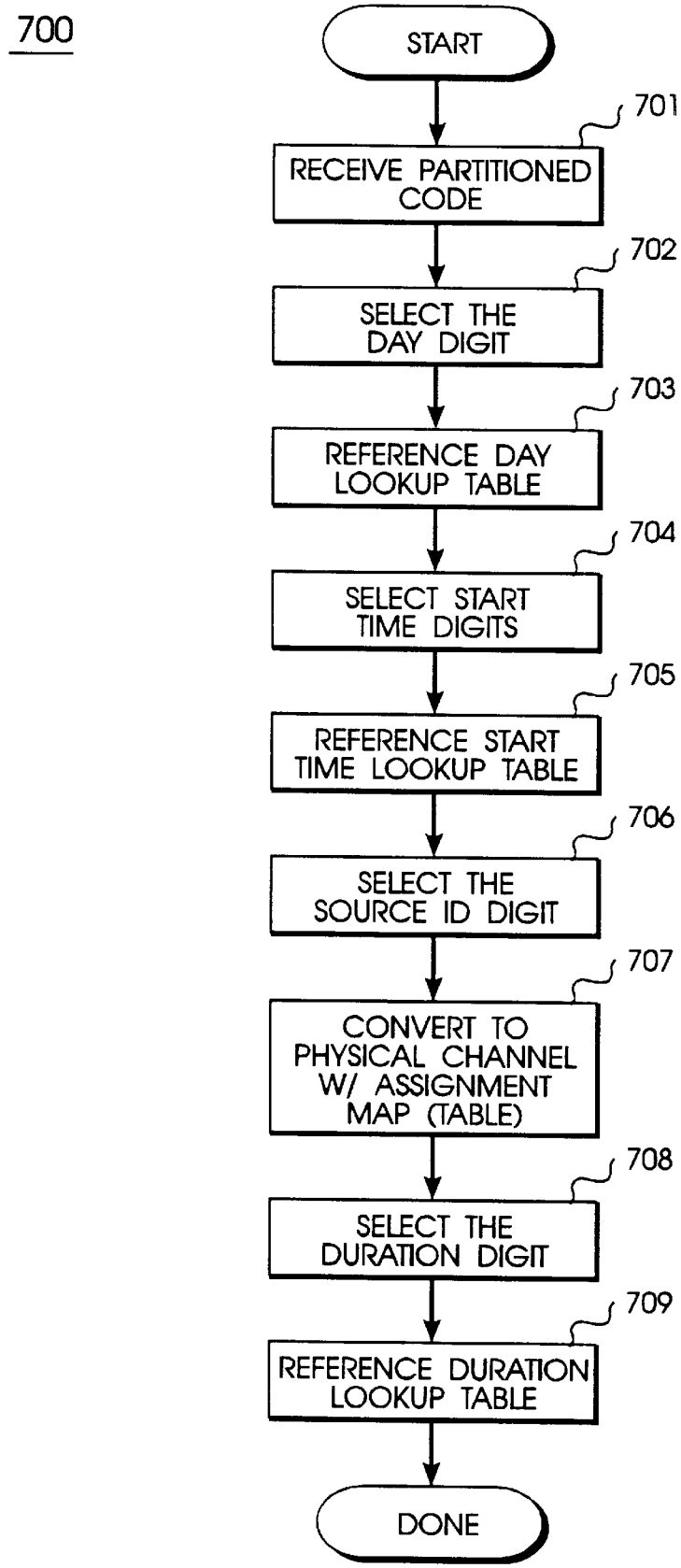
FIG. 7 is a flow diagram of a method of decoding partitioned codes in accordance with the present invention.

Referring now to FIG. 7, there is shown a method 700 for decoding the partition code of the present invention. In step 701, the partition code is received, e.g., into RAM 52, from the user. In step 702, the day digit (e.g., digit 403) is selected or isolated from the partition code. Those skilled in the art will appreciate various techniques (e.g., masking unwanted digits) for isolating a desired digit or digits contained within a plurality of digits. In step 703, a day lookup table is referenced to convert the day digit into a corresponding day of the week (e.g., Sunday, Monday, Tuesday, and so forth). In particular, the day digit 403 is an index into an array of days. The appropriate day of the week is selected from the array by dereferencing (i.e., converting from) the index (day digit). The day lookup table, as well as other lookup tables, may be stored in EPROM 60, ROM 54, or other memory device.

After decoding the day digit, the method proceeds to step 704 for selecting the start time digits (e.g., digits 404). The start time digits may be decoded in one of two manners. In a preferred method, the start time digits are an index into a start time lookup table. Thus, the proper start time may be determined by dereferencing the index (start time digits) of the start time lookup table. In one embodiment, the start time lookup table comprises an array of start times represented in minutes with each member of the array being greater than its preceding member by a preselected time interval, e.g., 15 minutes. In an alternate method of decoding the start time digits, a preselected time unit (e.g., 15 minutes) is referenced and multiplied by the start time digits to yield a time of day expressed in minutes. This may then be quite easily converted into hour:minutes format.

In step 706, the program source identifier or source ID (e.g., digits 405) is selected. In step 707, the source ID is converted into its corresponding physical channel by referencing the assignment table or map (previously described herein above), the source ID serving as an index for dereferencing the map. In step 708, the duration digit (e.g., digit 406) is selected. Again, the selected digit serves as an index into an array of duration times. Thus, in step 709 the duration of the program is decoded by dereferencing the index (duration digit).

In a preferred method, the duration lookup table comprises entries of at least two different time intervals. For example, the first eight entries in the table may represent duration times spaced at 30 minutes intervals; subsequent entries may be in intervals of one hour. Effectively, programs having a duration of 4 hours or less are recorded in intervals of 30 minutes, and programs greater than 4 hours are recorded in intervals of one hour. Upon conclusion of step 709, control is returned to the system.

It will be apparent to those skilled in the art that the selected digits of the partitioned code operate independently of one another, and therefore there is no required sequence for decoding the digits. While method 700 has been illustrated with a six-digit partitioned code, it will be apparent to those skilled in the art to employ other partitioned codes in the method. Furthermore, those skilled in the art will appreciate additional decoding steps within the scope of the present invention. For example, an advanced programming feature digit may be selected and decoded using the teachings of the present invention. Additionally, at any point within method 700, the decoded code or portions thereof (e.g., the dereferenced day) may be provided to microprocessor 50, e.g., for display by video display generator 36 or LCD display 180.

VIII. Advantages

The partitioning methods of the present invention has several advantages when compared to prior techniques, especially in the area of user interface and publishing. Traditionally, program listings are grouped by starting time and day, under a common time header. Adhering to printed tradition, a time code (which includes both time and day information) is associated with each time header. In FIG. 5, for example, 8:30 PM is coded as 182 (entry 300). The second code segment, which nominally is a 3 digit number, is printed next to each listing. Also seen in FIG. 5, Masterpiece Theater on channel 6 is coded as 061 (entry 310). The complete program code is 182-061.

While a compressed code may be short as two digits, the average code is much longer and averages about 6 digits. In contrast, the partitioned-code requires only three digits to be printed next to each listing. A saving of 3 digits per listing translates to a saving of 30,000 characters for a metropolitan weekly guide with 10,000 listings. Thus, the partitioned code is far more efficient overall.

Although the present invention has been illustrated in a specific embodiment, many different implementations are possible and will readily occur to one skilled in the art. For example, it would be obvious to encode the time and day information, using a different assignment of three digits.

What is claimed is:

1. A method for programming a VCR having a tuner for unattended recording using a microprocessor, a first memory location, and a second memory location, the method comprising the steps of:

partitioning a single user input code into a first segment and a second segment wherein, the first segment includes a first code representing time and day and the second segment includes a second code representing channel and program lens;

sequentially storing in the first memory location a lookup table of a first set of the first codes and corresponding times and days, so addressing one code of the fist set accesses the corresponding start time and day;

storing in the second memory location a lookup table of a second set of the second codes and corresponding channels and proven length, so addressing a code of the second set accesses the corresponding channel and program length;

inputting a code of the first set representing time and day, into the microprocessor;

configuring the microprocessor to retrieve the start time and day corresponding to the inputted code of the first set firm the first memory location;

inputting a code of the second set, representing channel and program length, into the microprocessor;

configuring the microprocessor to retrieve the channel and program length corresponding to the inputted code of the second set from the second memory location;

configuring the microprocessor to store the retrieved sort time, day, channel, and program length; and configuring the microprocessor to set the tuner to the stored channel and to turn on the VCR at the stored start time and the stored day for the stored program length, thereby recording a television show telecast at the stored start time and day on the stored channel.

2. The method of claim 1, in which the codes of the first set all have the same number of digits.

3. The method of claim 2, in which the codes of the second set all have the same number of digits.

4. The method of claim 1, in which the codes of the second set all have the same number of digits.

5. The method of claim 1, additionally comprising the steps of:

printing the first and second sets of codes in a printed TV guide in positions that are related to the start times, days, and channels;

selecting a program to be recorded from the printed TV guide;

reading from the printed TV guide the code of the first set corresponding to the selected program, the step of inputting a code of the first set into the microprocessor inputs the read code of the first set; and reading from the printed TV guide the code of the second set corresponding to the selected program, the step of inputting a code of the second set into the microprocessor inputs the read code of the second set.

6. The method of claim 5, in which the printed TV guide has a grid of cells in which TV program titles are printed, a first legend in which times and days are printed, and a second legend, perpendicular to the first legend, in which channels are printed, the printing step printing the first set of codes in the first legend and the second set of codes in the cells.

7. The method of claim 6, in which the first legend is horizontal and the second legend is vertical.

* * * * *

UNITED STATES PATENT AND TRADEMARK OFFICE
CERTIFICATE OF CORRECTION

PATENT NO. : 5,991,498
DATED : November 23, 1999
INVENTOR(S) : Patrick Young

Page 1 of 1

It is certified that error appears in the above-identified patent and that said Letters Patent is hereby corrected as shown below:

Column 17,
Line 49, replace "the fist" with -- the first --.
Line 53, replace "proven" with -- program --.

Column 18,
Line 8, replace "firm" with -- from --.
Line 15, replace "sort" with -- start --.

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*